(No Model.) 9 Sheets—Sheet 1.
C. R. RICHARDS.
MACHINE FOR COVERING BULLETS.

No. 493,519. Patented Mar. 14, 1893.

WITNESSES
H. A. Lamb
Mattie R. Davis

INVENTOR
Charles R. Richards
By
A. M. Wooster
Atty.

(No Model.) 9 Sheets—Sheet 2.

C. R. RICHARDS.
MACHINE FOR COVERING BULLETS.

No. 493,519. Patented Mar. 14, 1893.

(No Model.)  9 Sheets—Sheet 3.

C. R. RICHARDS.
MACHINE FOR COVERING BULLETS.

No. 493,519. Patented Mar. 14, 1893.

WITNESSES
H. A. Lamb
Mattie R. Davis

INVENTOR
Charles R. Richards
By H. M. Wooster
Atty (No Model.) 9 Sheets—Sheet 4.
C. R. RICHARDS.
MACHINE FOR COVERING BULLETS.
No. 493,519. Patented Mar. 14, 1893.
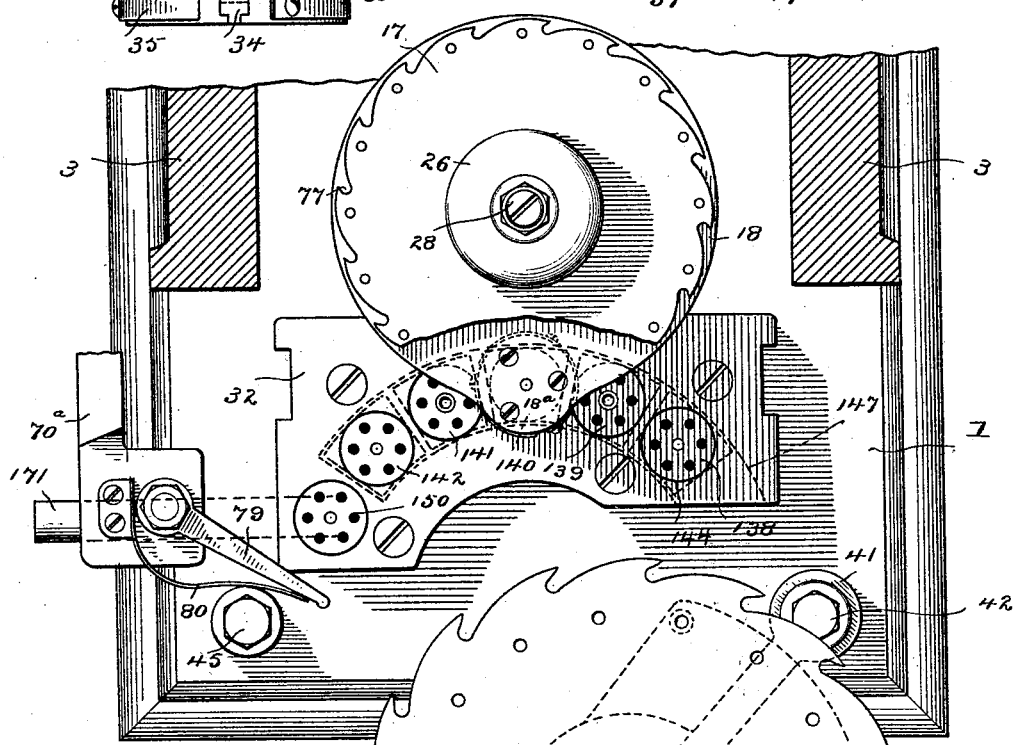

(No Model.) 9 Sheets—Sheet 5.

C. R. RICHARDS.
MACHINE FOR COVERING BULLETS.

No. 493,519. Patented Mar. 14, 1893.

WITNESSES
H. H. Lamb
Mattie R. Davis

INVENTOR
Charles R. Richards
By H. W. Wooster
Atty.

(No Model.) 9 Sheets—Sheet 6.
C. R. RICHARDS.
MACHINE FOR COVERING BULLETS.
No. 493,519. Patented Mar. 14, 1893.
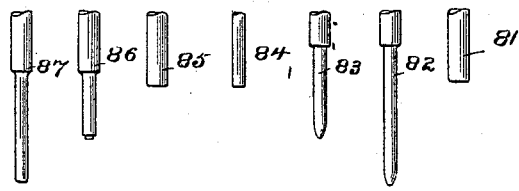
Fig.6.
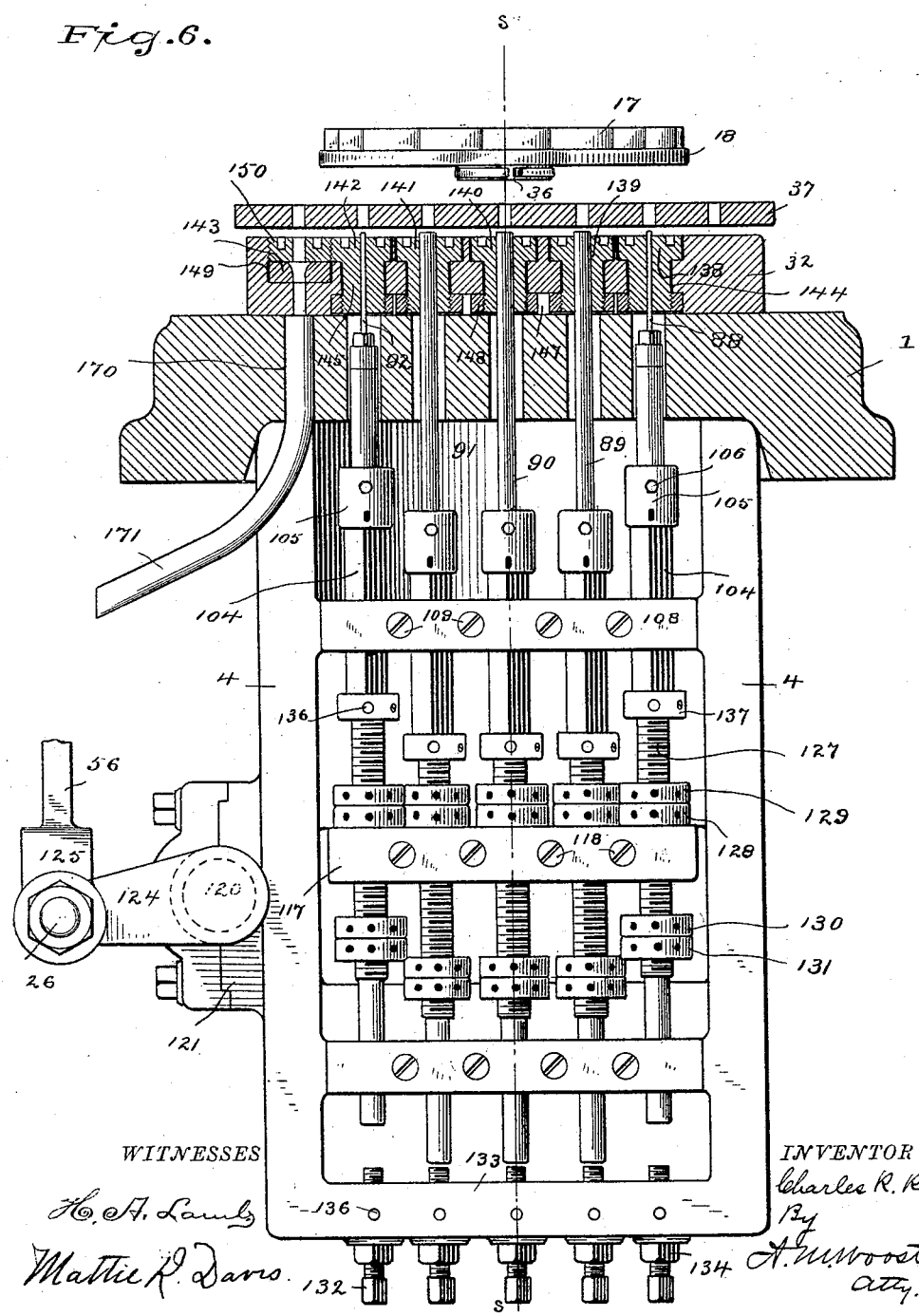
WITNESSES
H. A. Lamb
Mattie R. Davis
INVENTOR
Charles R. Richards
By H. M. Wooster
Atty.

(No Model.)  9 Sheets—Sheet 8.

C. R. RICHARDS.
MACHINE FOR COVERING BULLETS.

No. 493,519. Patented Mar. 14, 1893.

WITNESSES
H. H. Lamb
Mattie R. Davis

INVENTOR
Charles R. Richards
By A. M. Wooster
Atty.

(No Model.) 9 Sheets—Sheet 9.

C. R. RICHARDS.
MACHINE FOR COVERING BULLETS.

No. 493,519. Patented Mar. 14, 1893.

WITNESSES
H. A. Lamb
Mattie R. Davis

INVENTOR
Charles R. Richards
By A. M. Wooster
Atty.

UNITED STATES PATENT OFFICE.

CHARLES R. RICHARDS, OF BRIDGEPORT, CONNECTICUT, ASSIGNOR TO THE UNION METALLIC CARTRIDGE COMPANY, OF SAME PLACE.

MACHINE FOR COVERING BULLETS.

SPECIFICATION forming part of Letters Patent No. 493,519, dated March 14, 1893.

Application filed June 14, 1892. Serial No. 436,721. (No model.)

*To all whom it may concern:*

Be it known that I, CHARLES R. RICHARDS, a citizen of the United States, residing at Bridgeport, in the county of Fairfield and State of Connecticut, have invented certain new and useful Improvements in Machines for Covering Bullets; and I do hereby declare the following to be a full, clear, and exact description of the invention, such as will enable others skilled in the art to which it appertains to make and use the same.

My invention relates to the manufacture of covered bullets, that is bullets having a body or slug of lead, or an alloy of metals which is placed within a cover or case of harder metal, ordinarily an alloy containing more or less nickel; and the object of my invention is to produce a machine which will automatically perform the six operations required to cover the bullets, said operations having been heretofore performed, so far as I am aware, by six independent machines.

Figure 1:
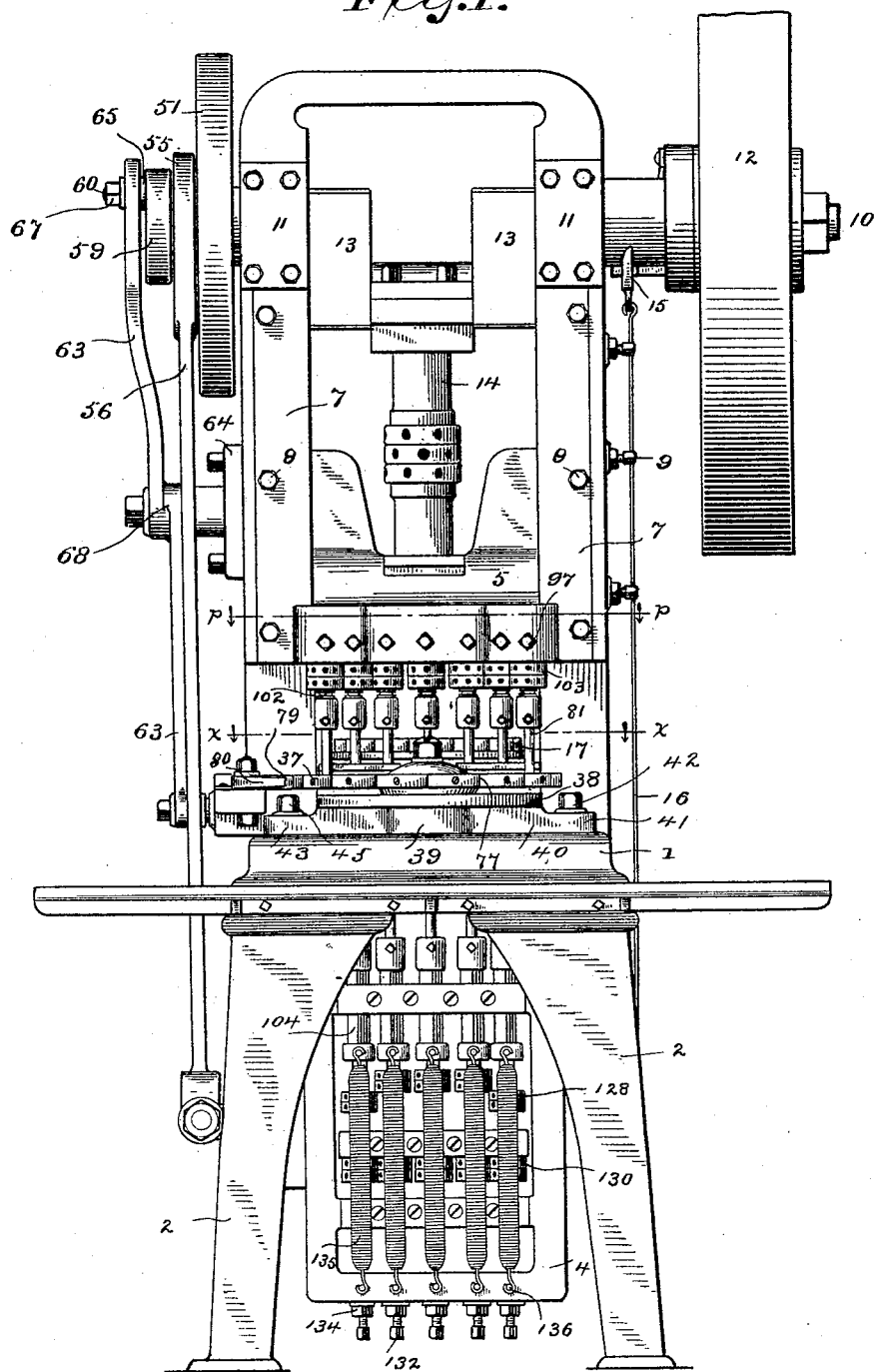
Figure 2:
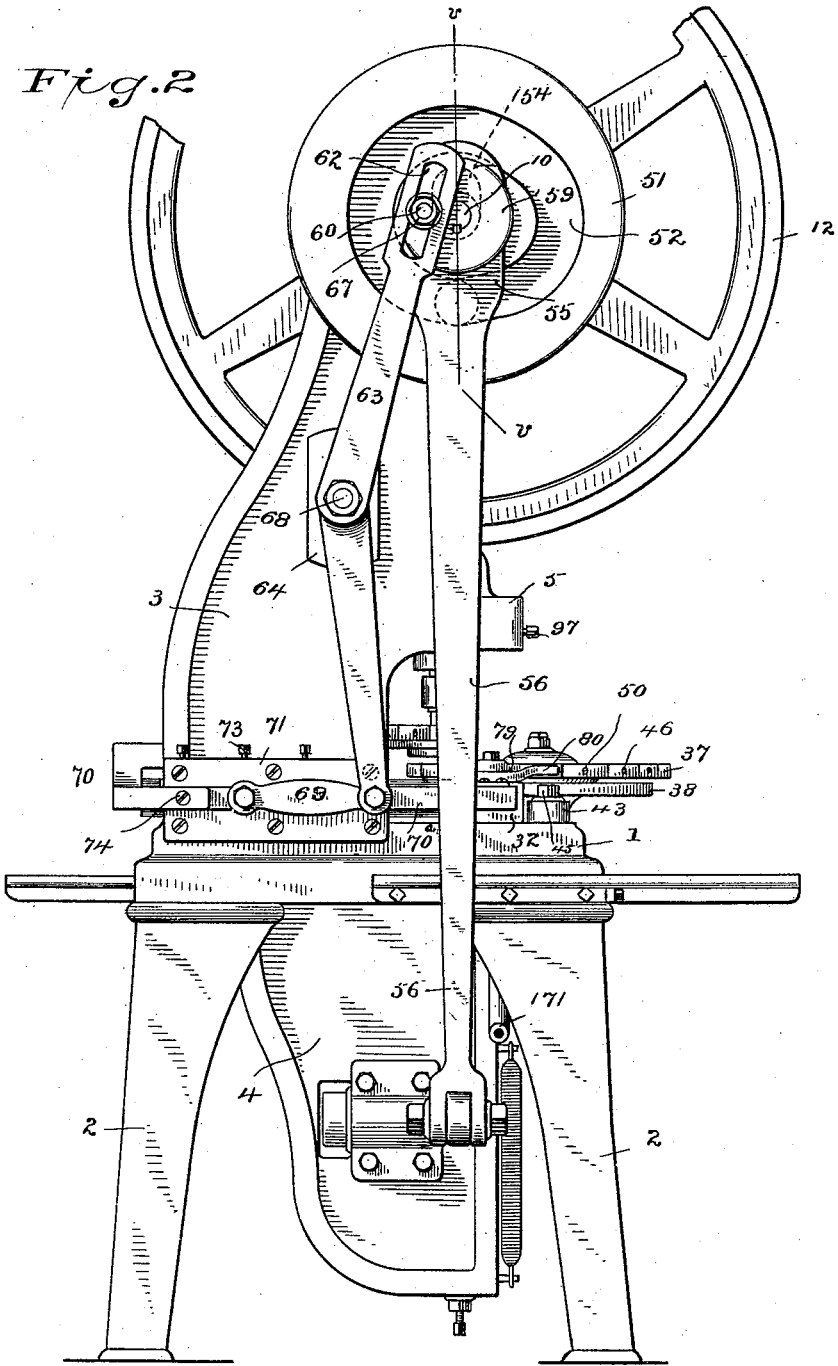
Figure 3:
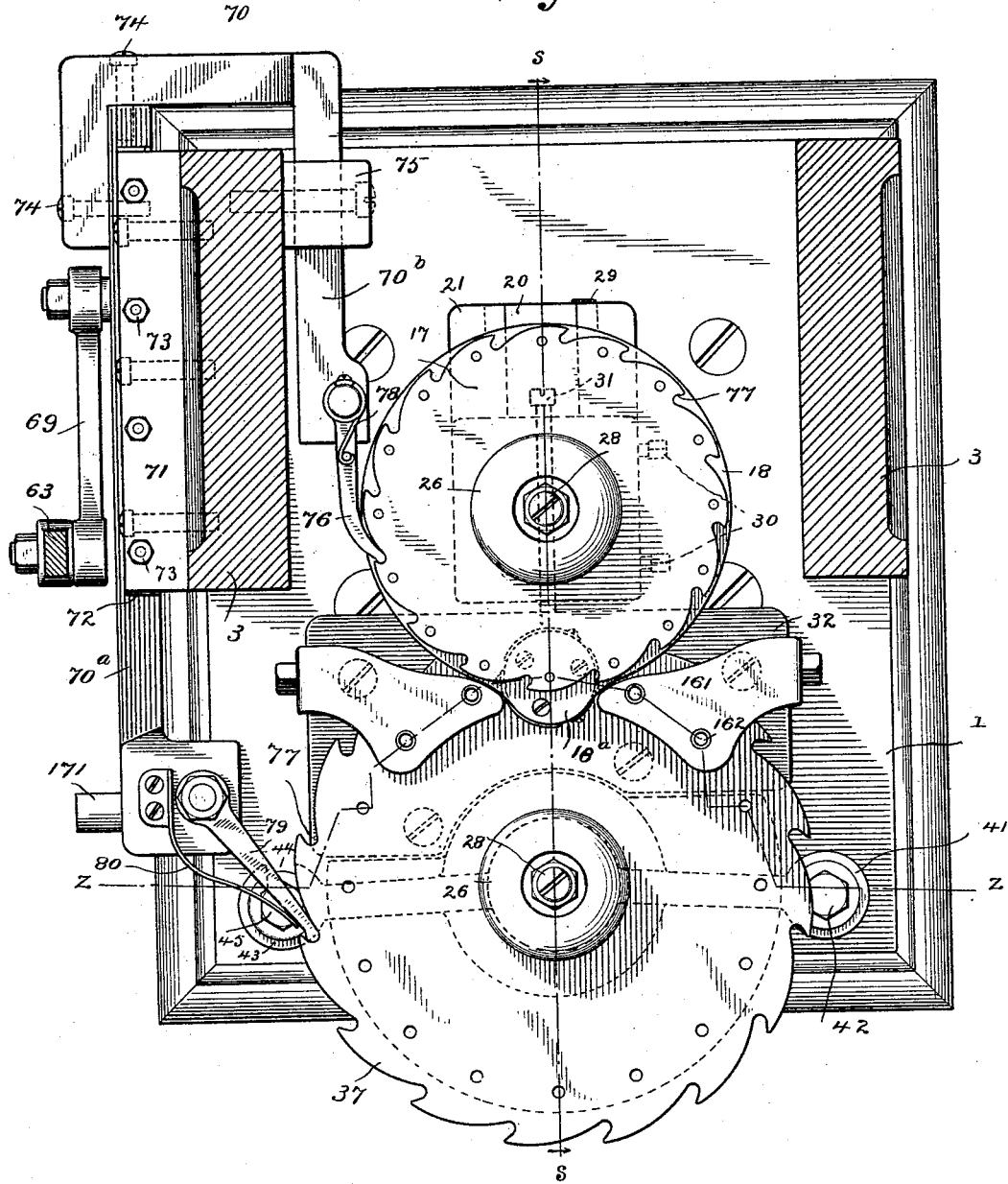

With these ends in view I have devised the novel machine which I will now describe referring by numbers to the accompanying drawings forming part of this specification in which, Figure 1 is a front view of the machine complete, Fig. 2 a side elevation as seen from the left in Fig. 1, Fig. 3 a horizontal section on an enlarged scale on the line $x\,x$ in Fig. 1 showing the bed, dials, and dial operating mechanism in plan, Fig. 4 a partial section on the same line showing the cover dial swung off from the bed plate so as to expose the dies. Figs. $4^a$, $4^b$, and $4^c$ are respectively a plan view, an elevation, and a section, on an enlarged scale, of the device for holding the bullet until the assembling punch descends. Fig. $4^d$ a detail sectional view on the same scale, of the edge of the cover dial showing the means which I preferably use for retaining the covers in place. Fig. 5 a vertical section on the irregular line $z\,z$ in Fig. 3, the position of the first and seventh punches being distorted in order to show the construction of the machine more clearly, the upper and lower punches being shown in the lowered, i. e. the operative positions, Fig. $5^a$ an enlarged detail sectional view of the fifth upper punch, Fig. $5^b$ an enlarged detail sectional view illustrating the mode in which I preferably connect the second and fifth lower punches to the holders or collets, Fig. $5^c$ an enlarged detail sectional view illustrating the mode in which I preferably connect the holders or collets to the slides, Fig. $5^d$ a detail sectional view illustrating the bushing in the stripper plate, Fig. 6 a view corresponding to Fig. 5 except that the upper and lower punches and parts by which the latter are carried are in the raised position, Fig. 7 a vertical section substantially on the line $s\,s$ in Fig. 5, the lower carrier and certain of the operative parts appearing in elevation, see also Fig. 3 in which said section, line $s\,s$ is likewise indicated, Fig. 8 a horizontal section on the line $m\,m$ in Fig. 7, Fig. 9 a horizontal section on the line $p\,p$ in Fig. 1, Fig. 10 a rear elevation corresponding to Fig. 8, the position of the parts being the same as in Fig. 5, Fig. 11 a detail sectional view on the line $v\,v$ in Fig. 2, and Fig. 12 is a rear elevation of the feed slide as it appears in Fig. 3.

Figure 7:
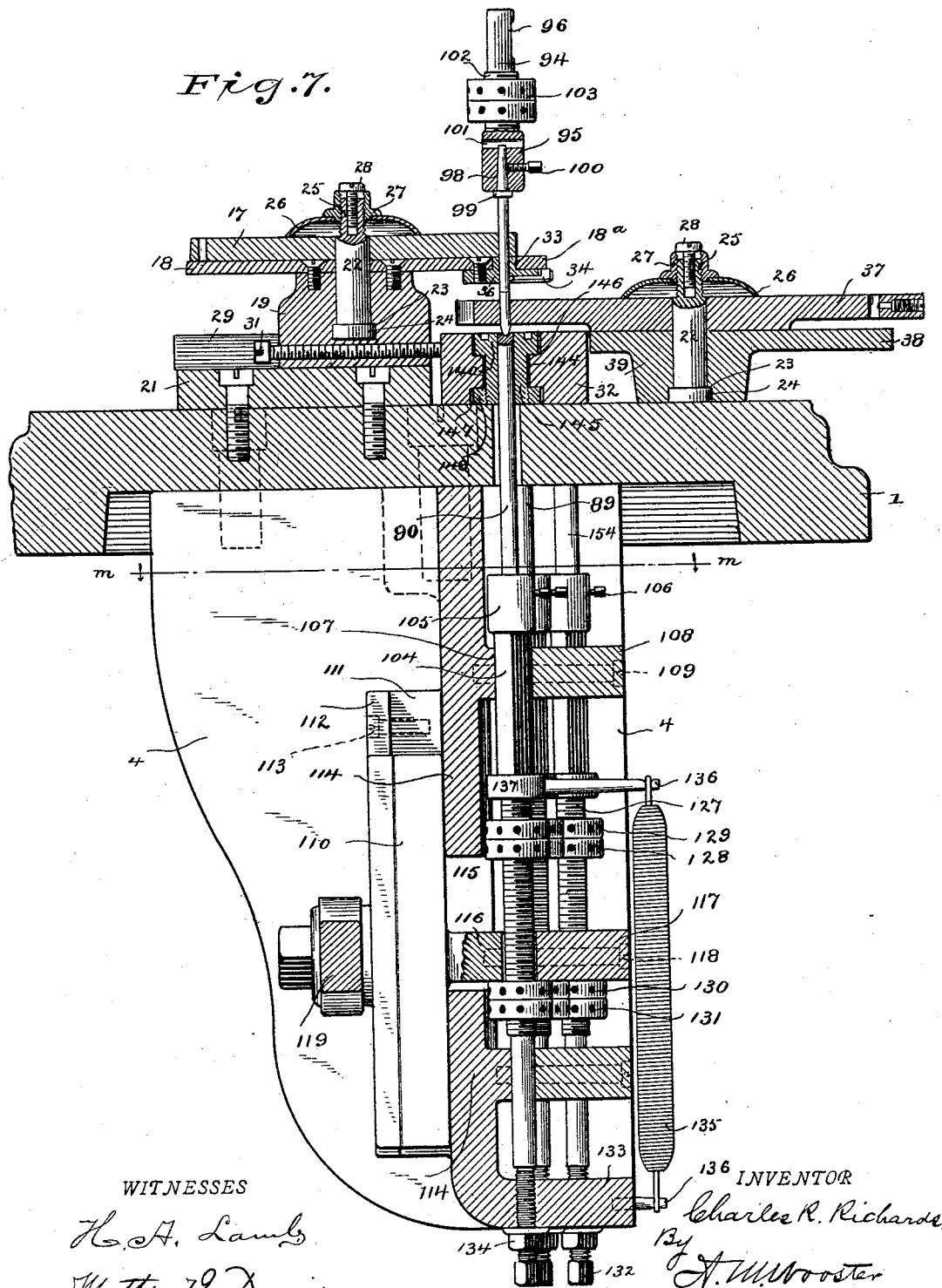

1 denotes the bed of the machine, 2 the legs, 3 upper side pieces preferably connected at the top and cast integral with the bed, 4 lower side pieces rigidly bolted to the under side of the bed, see Fig. 7, and 5 the carrier by which the upper punches are carried. This carrier is provided with V-shaped ribs 6 which slide in ways 7 secured to the upper side pieces by bolts 8 and made adjustable by means of bolts 9 which bear against the backs of the ways, bolts 8 passing through elongated openings as appears in Fig. 9, see dotted lines, so as to permit the ways to be adjusted in or out.

10 denotes the shaft which is journaled in boxes 11 in the upper side pieces and to which power is applied by a belt, not shown, running over belt-wheel 12.

13 denotes a double crank on the shaft between the upper side pieces, and 14 an adjustable connection by which the throw of the crank is imparted to the carrier.

The machine may be stopped or started at any time without shifting the belt, by means of a suitable clutch 15 operated by means of a rod 16 extending to a foot lever not shown, pivoted to the floor or to one of the legs. As the specific construction of this clutch forms no part of my invention I have not deemed it necessary to require illustration in detail.

17 denotes the bullet dial which rests upon plate 18 rigidly secured to a block 19 adapted to slide in way 20 in a block 21 rigidly secured to the bed, see Fig. 7. The bullet dial rotates on a stud 22 which extends upward from block 19 said block being in practice provided with a vertical opening having a shoulder 23, and the stud having a collar 24 engaging the shoulder. The upper end of the stud is reduced and threaded as at 25.

26 denotes a spring washer through which the stud passes and which bears upon the bullet dial, said washer being adjustably secured in position by a nut 27 and the nut being locked in position by a set screw 28 engaging the upper end of the stud. This washer in practice is so adjusted as to permit the bullet dial to turn freely but at the same time to retain it at just the position to which it is carried by the feeding mechanism which will presently be explained.

29 Fig. 7 denotes a gib in way 20, and 30 Fig. 3 locking bolts in block 21 the points of which engage the gib forcing the latter against block 19 thereby locking it in place after it has been adjusted, the adjustment of said block and the bullet dial being effected by means of a stop screw 31 which passes through block 19 and the point of which engages die block 32. This adjustment will be clearly understood from Fig. 7 in connection with Fig. 3. The stop screw is so adjusted that when its point is in engagement with die block 32 the bullet hole at the front of the bullet dial will be in perfect alignment with the assembling punch, and when in this position block 19 carrying the dial is locked there by bolts 30.

The bullets are fed to the holes in the bullet dial by hand. It will be seen from Fig. 7 that the dial lies closely in contact with plate 18 which of course prevents the bullets from dropping down. In front of said plate, however, is a hole 33 which is in exact alignment with the hole in the bullet dial that is at the front. When therefore rotation of the dial brings a bullet to the front it will leave the dial and drop down into hole 33. In order to prevent it from passing out of the plate however, I provide a bullet stop consisting essentially of three plungers 34, Figs. 7, 4$^a$ forced inward radially by springs 35. These plungers lie in openings in a plate 36 secured to the under side of plate 18 at the front, plate 18 being shown in the drawings as provided with a curved enlargement to correspond with the curvature of plate 36. These plungers check the bullet when it drops down from the bullet dial and hold it until it is driven downward by the assembling punch as will be more fully explained.

37 Fig. 7 denotes the cover dial carried by a swinging plate 38. The covers are fed to the holes in the cover dial in the same manner that the bullets are fed to the bullet dial, the heads of the covers resting upon plate 38 which prevents them from dropping out until they pass on to the die block 32. It will be seen from Figs. 3 and 4, in which the shape of plate 38 is shown in dotted lines, that the edges of plate 38 and the die block meet when the dial is in operative position, and from Fig. 7 in which both parts appear in section, that the top of plate 38 and the top of the die block are in the same horizontal plane. Upon the under side of plate 38 is a hub 39 which in the operative position rests upon the bed as clearly shown in Fig. 7. The hub is provided with a central opening having a shoulder 23 which is engaged by a collar 24 on a stud 22. The dial turns freely on this stud and is retained in the exact position to which it is fed by a spring washer 26 adjustably held in place by a nut 27, the nut being locked in position by a set screw 28 in precisely the same manner that the bullet dial is secured to block 19 and plate 18.

40, see Fig. 1, see also dotted lines Figs. 3 and 4, denotes a heavy cross piece on the under side of plate 38 which is cast integral therewith. At one end of said cross piece is a head 41 through which a bolt 42 passes, and at the other end is a head 43 having slot 44 which is adapted to engage a bolt 45, see Fig. 3. When it is desired to swing the cover dial away from the die block bolts 42 and 45 are loosened and the plate and dial swung out of the way as shown in Fig. 4.

In use the plate and dial are swung to the operative position as shown in Fig. 3, that is, a position in which the front cover hole will be in exact alignment with the front hole in the bullet dial and with the assembling punch. In this position the plate and dial are locked by tightening up bolts 42 and 45.

In order to prevent the covers from dropping down when they are placed by the rotation of the dial under the cover forming punch, and also to retain them in the dial after they have been forced out by the second and sixth upper punches, and returned to the dial by the second and sixth lower punches, as well as after they have been displaced by the other upper punches, as will be more fully explained, I provide in the edge of the dial shouldered recesses 46 in which are plungers 47 having collars 48 which engage the shoulders and which are forced forward by springs 49. The points of the plungers enter the cover openings, see Figs. 4 and 4$^d$, and bear against the covers with sufficient friction to hold them in place. The outer ends of the openings are closed and the springs held in place by screws 50.

Figure 11:
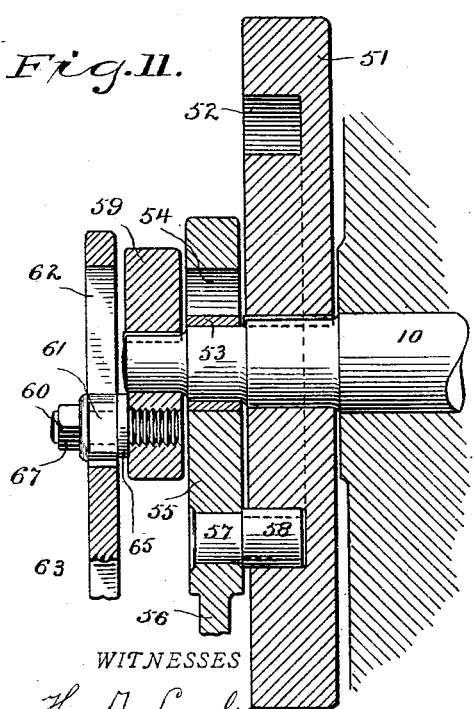
Figure 12:
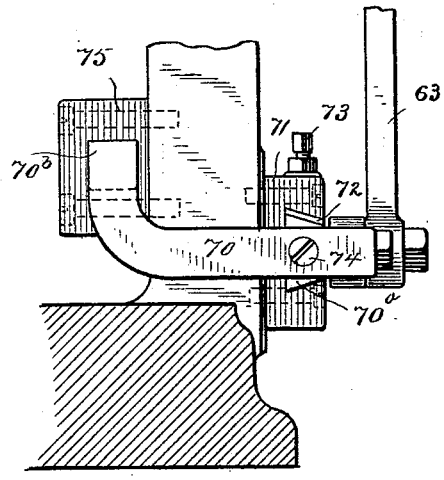

Turning now to Figs. 1, 2, and 11, at the end of the shaft opposite to the belt wheel and clutch is a disk 51 rigidly secured to the shaft and having in its outer face a cam-groove 52. Outside of this disk on the shaft is a bushing 53 which lies in an elongated opening 54 in the head 55 of a connecting rod 56.

57 denotes a stud on the inner side of the connecting rod which carries a roller 58 engaging cam-groove 52. It will be seen that rotation of disk 51 must necessarily impart vertical reciprocatory motion to the connecting rod, the function of which I shall presently describe. Outside of the connecting rod and rigidly secured to the shaft is a crank disk 59.

60 is a crank pin extending outward from disk 59 and carrying a traveler 61 (Figs. 1, 2, 11) which engages a slot 62 in a lever 63 pivoted as at 68 to a block 64 upon the side piece. The traveler oscillates freely on the crank pin and lies between a collar 65 and a nut 67 engaging the threaded outer end of the crank pin. It will be seen from the above that rotation of the crank disk must necessarily produce oscillatory movement of the lever.

69 denotes a link one end of which is pivoted to the lower end of lever 63, the other end being pivoted to a slide 70 which I term the feed slide. This slide I have shown as made in two parts denoted respectively by $70^a$ and $70^b$. Part $70^a$ is preferably made dove-tailed and slides in a way in a block 71 bolted to one of the side pieces, see Figs. 2, 3, and 12.

72 denotes a gib in the way, and 73 set screws the points of which engage the gib for the purpose of taking up lost motion in use. Part $70^b$ of the feed-slide is made U-shape so as to pass around the side piece as shown in Fig. 3 and is rigidly secured to part $70^a$ by means of heavy screws 74. In practice part $70^b$ is curved upward and then forward again so that the inner arm of said part lies in a higher horizontal plane than the outer arm and part $70^a$, the purpose of which will presently be apparent.

75 is a guide rigidly secured to the side piece and provided with an opening to receive part $70^b$, said part sliding freely through the guide which retains it in operative position. At the forward end of part $70^b$ is a pawl 76 which is adapted to engage teeth 77 in the edge of the bullet dial.

78 is a spring which acts to hold the pawl in engagement with the teeth and edge of the dial. At the forward end of part $70^a$ is a pawl 79 which is adapted to engage teeth 77 in the edge of the cover dial, a spring 80 acting to hold said pawl in engagement with the teeth and edge of the dial. It will readily be seen from the above that at each backward movement of the feed slide the pawls will slip backward over the edges of the teeth of the dials, said dials being held against backward movement by the friction washers, and that when the pawls have passed the teeth the springs will force them inward into the notches. When the forward movement of the feed slide takes place each dial will be fed forward thereby one tooth.

81, 82, 83, 84, 85, 86, and 87 (Fig. 5) denote punches which I term respectively the first, second, third, fourth, fifth, sixth and seventh upper punches, and 88, 89, 90, 91, and 92 denote punches which I term respectively the second, third, fourth, fifth and sixth lower punches and which coact with the second, third, fourth, fifth and sixth upper punches in the manner which I shall presently describe. There are no first and seventh lower punches but for convenience in description I designate the lower punch which co-operates with the second upper punch as the second lower punch and so on. The upper punches are carried by carrier 5, (Fig. 1) which is provided in its under side with sockets 93, see dotted lines in Fig. 9, which receive the shanks 94 of punch holders 95 the front of each shank being cut away as at 96, see Fig. 7, and said cut away portions being engaged by set screws 97 whereby they are locked in position in the socket. The lower ends of the holders are provided with sockets 98 which receive the shanks of the punches, said punches being preferably provided with collars 99 which rest against the lower ends of the holders and the punches being retained in the holders by set screws 100.

101 denotes transverse openings in the holders with which sockets 98 intersect and which permit a rod to be inserted to loosen the punches should the shanks become set in the sockets. The lower portions of the shanks of the punch holders are screw threaded as at 102, see Fig. 7, said threaded portions being engaged by nuts 103. The upper nut in use lies in contact with the under side of carrier 5 the lower nut serving as a lock nut. In use should it be desired to adjust the punches either up or down the lower nut is turned away from the upper nut and the upper nut is then rotated in either direction as may be required to raise or lower the punch holder and punch. After the holder and punch are adjusted they are locked in position by turning the lower nut up against the upper one. The lower punches are carried by slides 104 (Figs. 5 and 6) having at their upper ends punch holders 105 in which the punches are secured by set screws 106. The upper ends of the slides are preferably made angular in cross section to hold them against turning and the lower ends round in cross section, see Fig. 7, and move in half sockets formed respectively in cross pieces 107 which are cast integral with the lower side pieces 4, and in blocks 108 secured to the cross pieces by screws 109. The line of joinder of the blocks to the cross pieces is clearly shown in Fig. 8. The exact location of this line of joinder is of course not essential. It is simply necessary that the blocks and cross pieces be so joined together as to permit the slides to be taken out when the cross pieces are removed.

Figure 8:
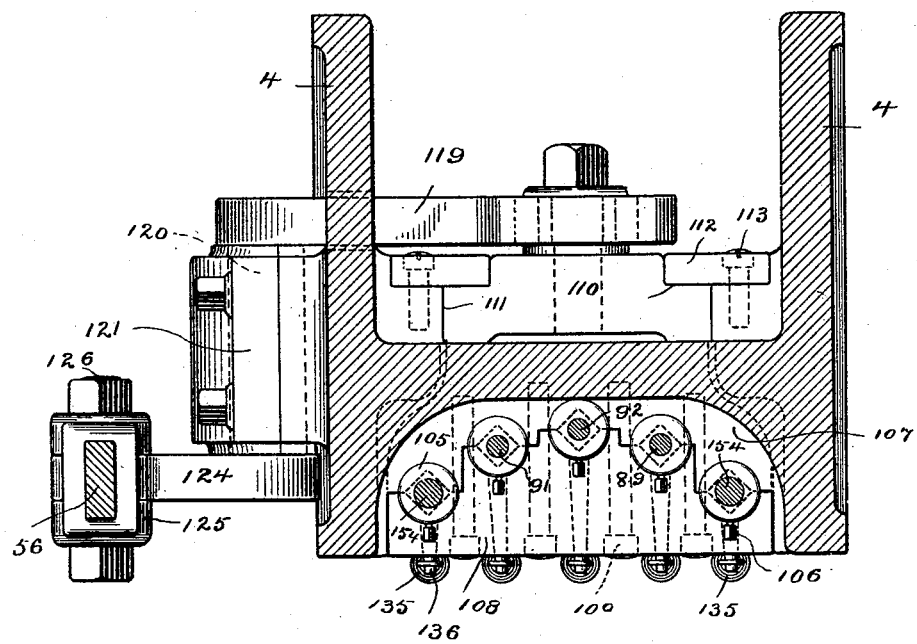
Figure 9:
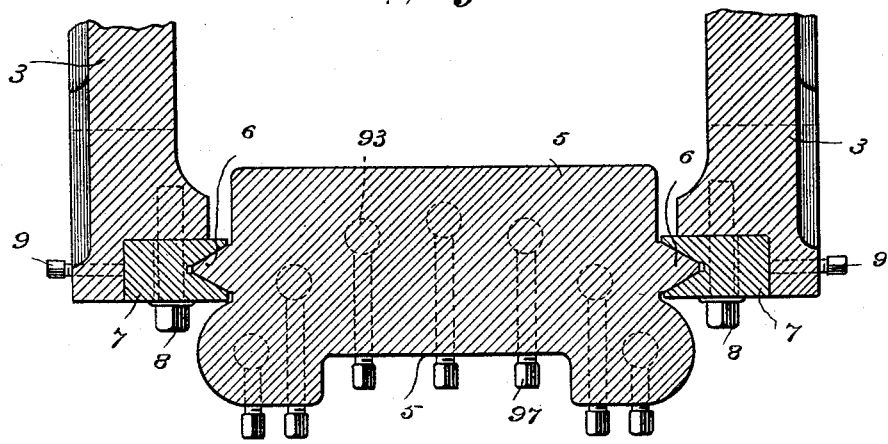
Figure 10:
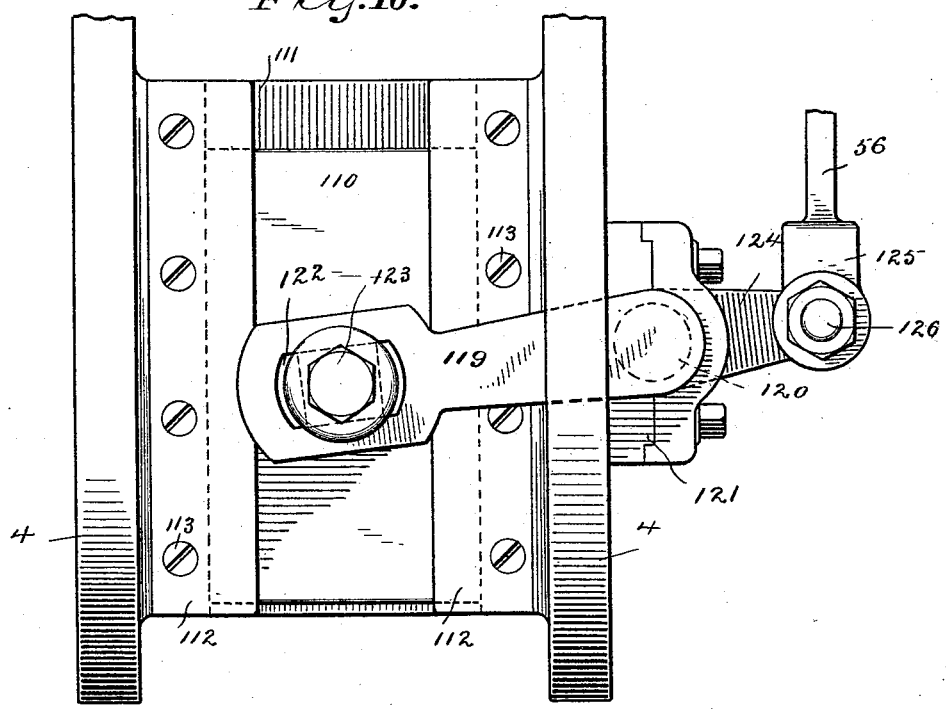

110, see Figs. 7, 8, and 10, denotes a slide which moves in ways 111 cast integral with the lower side pieces, said slide being held in operative position by plates 112 secured to the ways by screws 113.

114 denotes a heavy vertical web connecting the lower side pieces.

115 is an opening in the web through which an extension 116 of the slide extends. The front line of this extension corresponds in outline with the front line of cross pieces 107.

117 denotes a block corresponding in outline with blocks 108 which is secured to the extension by screws 118. The central portions of slides 104 are made round and screw threaded as will be again referred to, and the sockets in the extension and block 117 which receive slides 104 are made large enough so that said slides do not come in contact therewith, see Fig. 7.

Vertical movement is imparted to slide 110 by means of an arm 119 extending from rock-shaft 120 journaled in a box 121 in one of the lower side pieces. The inner end of arm 119 is enlarged and provided with a slot 122 which contains a sliding block, see dotted lines Figs. 8 and 10, through which a bolt 123 passes by which the arm is connected to the slide.

124 is an arm extending outward from the other end of rock-shaft 120.

125 denotes a yoke at the lower end of connecting rod 56, and 126 a bolt connecting arm 124 to the yoke. The central portions of slides 104 are screw threaded as at 127.

128 denotes nuts engaging the threaded portions which act to determine the upward movement of the slides, and 129 denotes set nuts which lock nuts 128 in position after adjustment. When the vertical movement of slide 110, the extension and block 117 takes place nuts 128 are engaged by the block and extension and slides 104 and the punches are raised the required distance as clearly shown in Fig. 6.

130 denotes nuts below the extension and block 117 which are engaged by said extension and block when the downward movement of slide 110 takes place. These nuts are locked in position by check nuts 131. The downward movement of slides 104 is determined by set screws 132 in a cross piece 133 which connects the lower side pieces at the bottom. The upper ends of these set screws are engaged by the lower ends of the slides as clearly shown in Fig. 5. The set screws are locked in position after adjustment by check nuts 134.

135 denotes strong springs the upper ends of which are connected to pins 136 extending outward from collars 137 on slides 104, the lower ends of said springs being connected to similar pins extending outward from the bottom cross piece. These springs act to draw slides 104 and the lower punches downward the instant the downward movement of slide 110 commences. Should the springs fail to act for any reason whatever, slides 104 will be moved downward by the engagement of the extension and block 117 with nuts 130 so that it is rendered impossible for slides 104 to stay up or become set in use.

138, 139, 140, 141, and 142 denote dies in die block 32 which co-operate with the punches. These dies I term respectively the second, third, fourth, fifth and sixth dies. There is no die co-operating with the first upper punch but for convenience in description I designate the die co-operating with the second upper and lower punches as the second die. The second, third, fourth, fifth and sixth dies lie in circular openings 144 in the die block. The dies are shown as provided with shanks 145, the portion of openings 144 at the center of the die block being reduced in size to correspond with the shanks, the dies in fact, resting on shoulders 146 in the die block. The construction of this portion of the machine will be clearly understood from Figs. 4, 5, and 7. In the under side of the die block is a curved groove 147.

148 denotes nuts in this groove which are engaged by threads on the shanks of the dies. The shapes of the groove and the nuts are clearly shown by dotted lines in Fig. 4. It will be seen that the ends of the nuts are arcs and the sides of the nuts parts of radii of a circle of which the outer edge of the groove is an arc. The dies and their shanks fit loosely in openings 144 and the nuts fit loosely in groove 147 so as to permit adjustment of the dies. In practice the nuts are slid in at the open end of the groove, see at the right in Fig. 4, after which the dies are dropped down in openings 144 and their shanks are turned into the nuts to lock them in position after adjustment.

143 denotes the seventh die which lies loosely in a socket 149 and is retained in place by a circular nut 150 which screws in to the top of the die block, see Figs. 4 and 5.

It will be seen that the first, second, third, fourth, sixth and seventh upper punches are solid. The construction of the fifth upper punch is clearly illustrated in Fig. 5$^a$ and will presently be described.

The connection of the lower punches to the punch holders is clearly illustrated in Fig. 5$^c$. At the upper end of each punch holder is a socket 151. The lower end of each punch is provided with a groove 152. Within the socket is a two-part shouldered collet 153 the edges of which are provided respectively with depressions and projections so as to interlock, see dotted lines Fig. 5$^c$ and the parts of which are shaped to correspond with and loosely engage the grooves in the lower ends of the punches. When set screws 106 are tightened up they cause the edges of the two-part collets to engage each other and lock the two parts of the collets and the punches in the sockets. It will be seen that while the two-part collets hold the punches in place they do not clamp them tightly but permit slight movement of the punches in any direction.

The second and sixth lower punches are formed independently of the shanks. For this reason I designate the shanks of the second and sixth lower punches as 154. The connection of the second and sixth punches to their shanks is clearly illustrated in Fig. 5$^b$. The upper ends of the shanks are reduced and screw threaded and the lower ends of the punches are threaded. The lower ends of the punches engage nuts 155 and the reduced ends of the shanks are engaged by nuts 156 which are provided with openings 157 through which the punches pass loosely, and with sockets 158 in which nuts 155 lie loosely. Nuts 156 are screwed down upon the upper ends of the shanks and hold the punches firmly in place but permit free movement of nuts 155 and the punches in the horizontal plane, said nuts 155 resting upon the upper ends of the reduced portions of the shanks. The object of this looseness of fitting of the shanks and punches as illustrated in Fig. 5$^c$, and of the second and sixth punches as illustrated in Fig. 5$^b$ is to do away with unnecessary friction to avoid the possibility of any of the parts becoming set or sprung in use, and to insure perfect uniformity in the product of the machine. It will be seen from Figs. 5 and 6 that the lower punches do not at any time pass entirely out of the dies. I find it desirable, therefore, to provide slight movement of the lower punches so as to insure accuracy in results, the greatest possible accuracy even to a thousandth part of an inch being required in this class of work, which would be impossible should the punches become sprung even to the slightest degree, were they not free to move slightly to accommodate themselves to the dies.

As already stated the bullets are fed to the holes in the bullet dial and the covers to holes in the cover dial by hand. Both dials rotate toward the left. The first operation performed by the machine is by the first upper punch which is made flat ended as shown in Figs. 5 and 6. This punch which I term the setting punch engages the top of the cover and moves it down to just the required position for the next operation, the downward movement of the cover being stopped by the head 159 of a pin 160 which is socketed in swinging plate 38, see Figs. 3, 4, and 5. The cover is retained in just the position in which it is placed by the setting punch by one of the plungers 47 in the edge of the cover dial, see Figs. 5 and 7. The next movement of the cover dial places the cover in position to be acted on by the second upper and lower punches. These punches form the tip of the cover to the required shape, that is, they impart to the tip of the cover the conical form necessary to receive the bullet and fit it closely. The upper punch passes inside of the cover, forces it entirely through the cover dial and down into the second die as clearly shown in Fig. 5. The second lower punch co-operates with the corresponding upper punch in forming the extreme tip of the cover, and when the upward movement of the punches takes place forces the cover upward out of the die and sets it in the cover dial again, where it is retained by the plunger.

161, see Figs. 3 and 5, denotes a stripper plate bolted to the die block which is provided with bushings 162 having central openings which just permit the second and third punches to pass through but will not allow the covers to pass so that should the covers stick to the punches when the upward movement takes place they will be stripped therefrom and retained at the proper position in the cover dial. In Fig. 3 I have shown a stripper plate on each side of the machine. Either one or two may be used depending on the special shape of the punches used. The next movement of the cover dial places the cover in position to be acted on by the third upper and lower punches. These punches complete the formation of the tip of the cover and act especially to crowd the metal of the cover down and thicken it at the extreme tip. The lower punch, in fact, acts as a die and performs an important part in the tip thickening operation. The upward movement of the lower punch moves the cover upward sufficiently to place it in the proper position to be acted upon by the next pair of punches, the stripper acting to prevent the possibility of its being carried upward out of the cover dial by the third upper punch. The next movement of the cover dial places the formed cover directly under the front opening in the bullet dial which should contain a bullet and in suitable position for the operation of the fourth upper punch which I term the assembling punch. The downward movement of the fourth upper punch forces the bullet out of the bullet dial down through the opening in plates 18 and 36 and into the cover in the cover dial which lies just under it. The fourth lower punch engages the tip of the cover holding it during the assembling operation and when the upward movement of said punch takes place, see Fig. 6, moves the assembled cover and bullet upward slightly to its normal position in the cover dial where it is retained by the plunger 47 operating in connection with that special hole in the cover dial. The next movement of the cover dial places the assembled cover and bullet in position to be operated upon by the fifth upper punch, which I term the crimping punch. The fifth lower punch operates in precisely the same manner as the fourth lower punch, that is to say, it engages the tip of the cover and holds it during the crimping operation and when the upward movement takes place forces the covered and crimped bullet to its proper position in the bullet dial where it is retained by the plunger.

The special construction of the fifth upper punch is clearly illustrated in Fig. 5$^a$. In the lower end of the punch is a recess 163 which when the punch moves downward crimps or curves the edge of the cover inward over the base of the bullet. It will of course be understood that the exact shape of this recess varies to correspond with the special style of bullet that is being made.

In Fig. 5$^a$ I have illustrated a style of bullet in which the entire base of the bullet is not inclosed within the cover, the central portion of the base of the bullet being left uncovered. It is deemed sufficient to say that the wall of recess 163 is given the required conformation to crimp the edge of the cover down closely over the base of the bullet.

In order to prevent the possibility of the bullet sticking in the punch and being drawn upward thereby out of the cover dial I provide a plunger 164 in a recess 165 within the fifth upper punch and a spring 166 the action of which is to force the covered and crimped bullet out of the punch when the latter moves upward leaving the bullet in its proper place in the cover dial where it is retained by plunger 47. I have shown the lower end of the plunger as provided with a pin 167 which engages the base of the bullet proper. This pin may or may not be used.

168 is a pin lying in a transverse recess 169, which passes through the plunger and limits the movement thereof downward.

The next movement of the cover dial places the covered and crimped bullet in position to be operated upon by the sixth upper and lower punches which swage, i. e. compress and compact the covered and crimped bullet. The sixth upper punch forces the bullet entirely out of the cover dial and down into the sixth die as clearly shown in Fig. 5. The sixth lower punch holds the tip of the bullet, assists in the swaging operation, and when the upward movement takes place, expels the bullet from the die and forces it back into the hole in the cover dial through which it has just been driven, where it is retained by the plunger.

As it is absolutely essential that the completed bullets be of uniform size within the minutest fraction of an inch, each bullet is by a seventh and final operation forced through a sizing die which I have designated as 149. Immediately below the sizing die is an opening 170 in the die block and communicating with said opening is a delivery tube 171. The operation of the seventh upper punch is to force the completed bullet out of the cover dial down through nut 150 through the sizing die and opening 170 into the delivery tube by which it passes out of the machine.

The operation of the entire machine has been so fully explained in the detailed description as hardly to require recapitulation. It is deemed sufficient to say briefly that the bullets are fed to openings in the bullet dial and the covers to openings in the cover dial by hand. Both dials are intermittently and simultaneously rotated toward the left. A suitable punch sets each cover in the dial. An upper and a lower punch then form the tip of the cover and another upper and lower punch complete the formation of the tip of the cover and thicken the metal at the tip. The next actuation of the cover dial places the formed cover in line with a bullet in the bullet dial. The fourth upper punch assembles the bullet in the cover, the latter remaining in the cover dial. The fifth upper punch crimps the edge of the cover over the base of the bullet. The sixth upper punch swages the bullet in the cover and the seventh upper punch forces the completed bullet through a sizing die and expels it from the machine. Suitable dies are provided which coact with the second, third, fourth, fifth, and sixth upper and lower punches in their respective operations. In the case of the second and sixth operations, namely, the operations of forming the cover and swaging the completed bullet, the upper punch forces the cover or completed bullet as may be, entirely out of the cover dial and down into the corresponding die from which it is forced back to its normal position in the cover dial by the lower punch. The third, fourth, and fifth lower punches act in connection with the corresponding upper punches and set the cover or covered bullet as may be in the cover dial after the corresponding upper punch has operated upon it. The movement of the upper punches is a regular, vertical, reciprocatory motion, the punches moving in unison. After the upper punches have moved upward out of the way, the lower punches move upward and reset the covers or bullets as may be in the cover dial and then move backward to their lowered position at which point they coact with the upper punches. The dies are set loosely in the die block and the lower punches are set loosely in the punch holders, so as to permit slight movement of these parts which avoids friction and danger of breakage and also insures perfect uniformity in the product of the machine, the upper punches being made adjustable to the minutest fraction of an inch. It will of course be understood that the details of construction may be varied within reasonable limits without departing from the principles of my invention.

I claim—

1. The combination with the bullet dial, plate 18 upon which it rests and block 19 to which said plate is secured, of a block 21 in which block 19 slides, set screw 31 engaging a fixed portion of the machine for determining the forward movement of the block, and a bolt 30 by which the block is held in position after adjustment.

2. The combination with the operating punch and the cover dial, of swinging plate 38 by which said dial is carried, and adapted to be swung to and from operative position under the punch, said plate acting to hold the covers in the openings in the dial until they are carried into position to be acted upon.

3. In combination, the cover dial having the openings for the covers, the die block having the die and the swinging plate 38 carrying the cover dial plate and extending beneath a number of the openings in said dial the said swinging plate and die block having their upper surfaces in the same plane and their adjacent faces adapted to abut against each other and form a continuous supporting surface below the cover dial, substantially as described.

4. The combination with the cover dial, of swinging plate 38 having heads 41 and 43, the latter having a slot 44, a bolt 42 passing through head 41 upon which the plate swings, and a bolt 45 which is adapted to enter slot 44 by which the swinging plate and dial are locked in operative position.

5. The combination with the cover dial, of swinging plate 38 having cross piece 40 and hub 39, a shouldered stud extending upward through the hub upon which the dial turns, and a friction washer and nut whereby the dial is retained in position after each actuation.

6. In combination, the die block 32, having a series of openings 144 with shoulders 146 the dies fitted to said openings and shoulders, and having screw threaded lower ends, said block having also a continuous groove extending from end to end of the series of openings and the series of nuts arranged in said groove and held against rotation by the walls thereof, said nuts being adapted to receive the screw threaded ends of the dies, substantially as described.

7. The combination with the die block 32 having circular openings 144 with shoulders 146 and a curved groove 147 in its under side, of nuts in said groove the ends of which are arcs and the sides radii so as to permit the nuts to be slid into and out of the groove, and circular dies lying in said openings and resting on the shoulders, and having shanks threaded to engage the nuts.

8. The die block having circular openings 144 and shoulders 146 and a curved groove in its under side, in combination with nuts lying in said groove and dies lying in said openings and having threaded shanks engaging the nuts so that in use said dies may be adjusted in any direction in the horizontal plane.

9. The combination with the die block having socket 149 and opening 170 below said socket, of sizing die 143 in the lower part of said socket, nut 150 by which it is retained loosely in place, countersunk in the upper part of the said die block a delivery tube connected with said opening.

10. The combination with slide 110 having extension 116 and block 117 secured thereto, of slides 104 lying loosely in half sockets in said extension and block, said slides having threaded portions carrying nuts 128 which are engaged by said extension and block in the upward movement.

11. The combination with slide 110 having extension 116 and block 117 secured thereto, of slides 104 lying loosely in half sockets in said extension and block, said slides having threaded portions carrying nuts 128 which are engaged by said extension and block in the upward movement, and nuts 130 which are engaged by said extension and block in the downward movement.

12. The combination with slide 110 having extension 116 and block 117 secured to said extension, of slides 104 having threaded portions 127, nuts 128 engaging said threaded portions to determine the upward movement of the slides, and nuts 130 engaging said threaded portions below said extension and block and which are engaged in the downward movement, and check nuts 129 and 131 for locking said nuts in place after adjustment.

13. The combination with the lower side pieces, cross pieces 107 and blocks 108, of slides 104 lying in half sockets in said cross pieces and blocks, nuts 128 on said slides, and slide 110 having extension 116 and block 117 connected to the extension, said block and extension having half sockets to receive slides 104 loosely and acting to lift said slides by engagement with the nuts when the upward movement takes place.

14. The combination with the lower side pieces, cross pieces 107 and blocks 108 secured thereto, said cross pieces and blocks being provided with half sockets, of slides 104 the upper portions of which are made angular in cross section, the central portions round and screw threaded and the lower ends round in cross section, the sockets in the upper and lower cross pieces and blocks being made respectively angular and round to receive said slides, nuts 128 engaging the threaded portions, and a vertically movable slide and block through which slides 104 pass and which engage said nuts to lift slides 104 as and for the purpose set forth.

15. The combination with slides 104 having nuts 128, slide 110 and block 117, of springs 135 connected respectively to slides 104 and to a fixed portion of the machine whereby said slides are drawn downward when the downward movement of slide 110 takes place.

16. The combination with slides 104 having nuts 128, and slide 110 and block 117 which engage said nuts to move slides 104 upward, of springs 135 which draw slides 104 downward after they have been raised by slide 110 and the block.

17. The combination with slides 104 having nuts 128, slide 110 and block 117 which engage said nuts to move slides 104 upward, of springs 135 which draw slides 104 downward, and set screws 132 engaged by the lower ends of said slides to limit the downward movement.

18. The combination with slides 104 having nuts 128 and 130, slide 110 and block 117 which engage nuts 128 to move slides 104 upward, of springs 135 which draw slides 104 downward, nuts 130 being engaged by the downward movement of slide 110 and block 117 to move slides 104 downward should the springs fail to act.

19. The combination with the lower side pieces, cross pieces 107 and 133, and blocks 108, of slides 104 moving in sockets in cross pieces 107 and the blocks, nuts 128 on said slides, slide 110 and block 117 through which slides 104 pass and which engage said nuts to raise slides 104, springs 135 acting to draw slides 104 downward, and set screws 132 in cross piece 133 which limit the downward movement of said slides.

20. The combination with slides 104 having nuts 128, slide 110 and block 117 through which said slides pass, of rock-shaft 120 having an arm 119 engaging slide 110 and an arm 124 which is pivoted to a yoke at the lower end of connecting rod 156.

21. The combination with slides 104, slide 110 and block 117 through which slides 104 pass, and rock-shaft 120 having an arm 119 connected to slide 110, and an arm 124, of connecting rod 56 the lower end of which is pivoted to arm 124 the upper end being provided with an elongated opening 52 and a roller 58, shaft 10 carrying a disk having a cam groove engaged by said roller and a bushing engaging said elongated opening.

22. The combination with the punches having grooves 152 at their lower ends, of punch holders 105 having sockets 151, two-part shouldered collets 153 in said sockets the parts of which are shaped to fit into the grooves, and set screws 106 which lock the parts of the collets together and retain the punches therein but permit movement thereof in the horizontal plane.

23. The combination with the cover dial and plate 38, of punch 81 and a pin 160 in said plate having a head 159 which limits the downward movement of the cover.

24. The combination with the bullet dial and spring actuated plunger 47, of plate 38 having pin 160 with head 159, and punch 81 which sets the cover in the dial where it is retained by the plunger.

25. In combination, the bullet and cover dials with means for operating them, the assembling die 140 below the cover dial, and between the axes of said dials, the upper punch for forcing the bullet through the bullet dial and through the cover dial with the cover into the die, the lower punch 90 operating in the die against the tip of the cover and means for operating said punch 90, to raise the cover and bullet into the cover dial, substantially as described.

26. In combination, the bullet and cover dials with means for operating them, the plate 18, with the spring plungers thereon for holding the bullets, the said cover dial having spring plungers 47 and revolving below the plane of the bullet dial, the die below the cover dial, the upper punch 84 for forcing the bullet through the bullet dial and through the cover dial with the cover into the die, the lower punch 90 operating in the die against the tip of the cover and means for operating the said punch 90, to raise the cover into the cover dial to engage the plungers 47, substantially as described.

27. In combination, the series of dies, including an assembling die, the cover dial arranged to move over the same and carry the cover from die to die, a series of upper and lower punches with means for operating them to transfer the covers from dial to die and from the dies back to the dial and a bullet dial with means for moving the same step by step to align its openings with those of its cover dial, the punch of the bullet dial operating to force the bullet into the cover in the cover dial and through the said dial with the cover into the assembling die, substantially as described.

28. The combination with the cover dial, die 141 and punch 91, of a punch 85 having an inwardly curved recess 163 which crimps the edge of the cover over the base of the bullet.

29. The combination with the bullet dial, sizing die 143 and nut 150, of punch 87 the cover dial moving over the sizing die, and tube 171 by which the finished bullets are expelled from the machine.

30. In combination, the cover dial the die below the same for forming the cover, the upper and lower punches operating in connection with the said die and dial, the bullet dial, the die to receive the bullet and cover from the cover and bullet dials, the upper and lower punches operating in connection with the said die, the crimping die below the cover dial, the upper and lower punches for said die, the means for operating the punches to transfer the covers and the covers with bullets from the cover dial to the dies and from the dies back to the dial and the means for rotating the cover dial step by step to carry the covers past the said dies and bullet dial, substantially as described.

31. In combination, a series of dies including forming dies and a sizing die, a cover dial moving over the same, the upper and lower punches, the bullet dial and means for operating the cover dial to carry the covers past the forming dies and bullet dial to the sizing die, substantially as described.

32. In combination, the cover dial, the bullet dial having openings to register with those of the cover dial, the assembling die arranged below and in line with the aligning openings of the bullet and cover dial and the punch for forcing the bullet through the bullet dial into the cover in the cover dial and thence with said cover through the cover dial into the assembling die, substantially as described.

33. The combination with the bullet dial, the cover dial, the upper punches and the dies, of the lower punches, slides 104 by which they are carried, nuts 128 on said slides, and a slide 110 and block 117 having half sockets to receive slides 104, said slide and block engaging the nuts in the upward movement to raise the lower punches at each actuation of the machine.

34. The combination with the bullet dial, the cover dial, the upper punches and the dies, of the lower punches, slides 104 by which they are carried, nuts 128 on said slides, and a slide 110 and block 117 having half sockets to receive slides 104, said slide and block engaging the nuts in the upward movement to raise the lower punches at each actuation of the machine, and springs 135 which draw the punches downward when slide 110 is moved downward.

35. The combination with the bullet dial, the cover dial, the upper punches and the dies, of the lower punches, slides 104 by which they are carried, nuts 128 and 130 on said slides, nuts 129 and 131 by which they are locked in position after adjustment, and a slide 110 and block 117 having half sockets to receive slides 104, said slide and block engaging nuts 128 to lift said lower punches each time slide 110 and the block move upward and engaging nuts 130 to move them downward each time slide 110 and the block move downward.

36. The combination with the bullet dial, the cover dial, the upper punches and the dies, of the lower punches, slides 104 by which they are carried, nuts 128 on said slides and a slide 110 and block 117 which engage said nuts to raise the lower punches, springs 135 which draw the lower punches downward, and set screws 132 which limit the downward movement of the lower punches.

37. In combination, the dials, the upper and lower set of punches and means for operating said parts comprising a crank shaft journaled in the upper part of the frame and connected with the upper punch carrier, the lower punch carrier the lever 119—124 connected therewith, the link 56 connecting the lever with the crank shaft, the pawls and pawl slides for operating the dials and the lever 63, connected with said pawl slides and to the upper crank shaft to be driven therefrom, substantially as described.

38. In combination, the cover and bullet dials with means for operating them, the assembling punch for bringing the bullet and cover together and an assembling die for receiving the assembled parts, substantially as described.

39. In combination, the dies, the series of punches adapted thereto and to be operated to different degrees, the slides capable of independent movement, the reciprocating block with means for operating the same to move all the slides, and the adjustable collars or contacts on the slides in line with the block to be operated thereby, substantially as described.

40. In combination, the dies, the series of upper punches, the series of lower punches with their slides capable of having independent movement, the reciprocating block arranged to contact with and operate said slides after a part of its movement has been lost, substantially as described.

41. In combination, the cover dial the bullet dial, the setting punch operating through the openings in the cover dial, the stationary bearing below the said punch in line with the opening in the cover dial, the assembling punch operating in connection with the bullet and cover dial and the means for rotating the dials whereby the covers will be carried from the setting punch to the bullet dial, substantially as described.

42. In combination, the series of dies including the forming and assembling dies, the series of upper punches operating in connection with said dies, the series of corresponding lower punches, the sizing die at one end of the series of dies, the setting bearing at the opposite end of the dies, the cover dial with means for moving it step by step over the dies and the setting bearing, the bullet dial and the end upper punches 81—87 operating in connection with the setting bearing and the sizing dies respectively.

In testimony whereof I affix my signature in presence of two witnesses.

CHARLES R. RICHARDS.

Witnesses:
A. M. WOOSTER,
MATTIE R. DAVIS.